United States Patent [19]

Kosh

[11] 4,413,524

[45] Nov. 8, 1983

[54] PULSATION THROTTLING DEVICE FOR A PRESSURE GAUGE

[75] Inventor: William S. Kosh, Shelton, Conn.

[73] Assignee: Dresser Industries, Inc., Dallas, Tex.

[21] Appl. No.: 362,321

[22] Filed: Mar. 26, 1982

[51] Int. Cl.$^3$ .............................................. G01L 7/00
[52] U.S. Cl. ...................................................... 73/707
[58] Field of Search ..................................... 73/707, 706

[56] References Cited
U.S. PATENT DOCUMENTS

| 1,162,982 | 12/1915 | Crocker ............................... | 73/707 |
| 1,619,444 | 3/1927 | Taylor ................................ | 73/707 |
| 2,147,031 | 2/1939 | Hastings et al. ..................... | 73/707 |
| 2,591,148 | 4/1952 | Green ................................. | 73/707 |
| 2,804,093 | 8/1957 | Scherer .............................. | 73/707 |

*Primary Examiner*—Donald O. Woodiel
*Attorney, Agent, or Firm*—Daniel Rubin

[57] ABSTRACT

A generally cylindrical plug is adapted for a snug fit in a socket bore communicating with the inlet of a pressure gauge. The plug includes an upstream portion and an axially contiguous downstream portion, each cooperating with the surrounding surface of the socket bore to define a continuous flow path communicating inward to the sensing unit of the gauge. Through the upstream portion, the flow path is annular in cross-section between the plug surface and the bore surface while the downstream portion defines a helical flow path communicating with the open bore downstream thereof. Dimensionally critical in the relationship of the flow path defined in the upstream portion, versus the flow path defined in the downstream portion is the requirement that the former have a clearance dimension relatively smaller than the minimum clearance dimension through the cross-section of the latter.

6 Claims, 4 Drawing Figures

PULSATION THROTTLING DEVICE FOR A PRESSURE GAUGE

TECHNICAL FIELD

The field of the art to which the invention pertains, includes the art of measuring and testing as applicable to gauge instruments.

BACKGROUND OF THE INVENTION

Pressure gauges are utilized in a wide variety of applications and environments for the measurement of fluid pressure. Typically, the installation of such gauges can vary from virtually calm fluid conditions in which the fluid being measured is pulsation free to a high frequency pulsing fluid as might be encountered for example from a reciprocating pump or compressor. To enable connection of a pulsating condition to the pressure gauge, it has been known to utilize a helical flow path of sorts such as afforded by a screw thread contained in a bore communicating with the inlet of the gauge. The helical flow path defined by the thread effectively throttles the pulsations and avoids their being transmitted to the sensing elements of the gauge. A pulsation dampener of the type described is disclosed for example in U.S. Pat. No. 1,162,982 to Crocker.

While the prior art pulsation dampeners of the type disclosed in the Crocker patent supra are effective for achieving the desired dampening effect, they are generally characterized by a relatively small continuous flow path of uniform cross-sectional dimension from inlet to outlet. In that arrangement, any particle of dirt or whatever contained in the fluid of size larger than the minimum cross section of the defined flow path tends to lodge in the flow path to effectively plug it thereat and eventually render the pressure gauge inoperative. Obviously, the extent to which plugging may occur will vary with the condition being encountered, but because of the potential plugging problem, it has been common to either provide a fine screen filter upstream of the dampener or tolerate the plugging problem as a maintenance item. Either of the foregoing has been regarded as less than satisfactory.

SUMMARY OF THE INVENTION

The invention relates to a pulsation throttling device for a pressure gauge and more specifically, to a novel construction thereof able to significantly reduce the plugging effect encountered with such devices of the prior art. This is achieved in accordance with the invention utilizing a generally cylindrical plug that is snug fit in a bore communicating with the inlet of the pressure gauge. The plug includes an upstream portion and an axially contiguous downstream portion, each of which cooperate with the surrounding surface of the bore to define a continuous flow path communicating with the sensing unit of the gauge. The upstream portion of the plug is annular in section to define a radial clearance between the plug surface and the bore surface while the downstream portion defines a helical path or whatever to effect pulsation dampening in the manner of the prior art. Critical in the foregoing relationship is that the radial clearance afforded by the upstream portion of the plug be dimensionally less than the minimum clearance of the downstream helix. In this manner, the upstream portion effectively filters excessive sized particles that could otherwise plug the flow path downstream. Since the upstream flow path is annular in section and has a much larger flow area, any blockage thereof by an individual dust particle at one point of the circumference has a minimal effect if any on the ability of the device to maintain its operability.

It is therefore an object of the invention to provide a novel pulsation throttling device for a pressure gauge that significantly reduces susceptibility of particle plugging as compared to similar purpose devices of the prior art.

It is a further object of the invention to effect the foregoing object with an inexpensive construction that is able to significantly reduce the previous maintenance associated with such devices.

Figure 1:
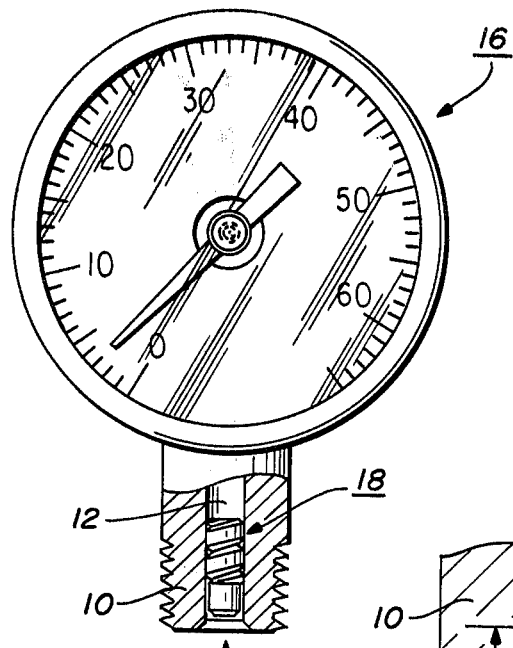
FIG. 1 is an elevation of a pressure gauge partially sectioned and incorporating the pulsation throttling device of the invention.

Referring now to the drawings, there is illustrated a typical gauge socket construction 10 comprising an inlet bore 12, in which pressure presented by arrow 14 is conventionally transmitted to a sensing element (not shown) of a pressure gauge 16. Contained snuggly fitting within the bore 12 is the pulsation throttling device 18 in accordance with the invention as will be described.

Throttling plug 18 is of a generally cylindrical cross-section that includes an upstream portion 20 extending for a distance X, and a contiguous downstream portion 22 extending for a distance Y determined adequate to effect the desired dampening effect. The flow path past the upstream portion is defined by an annular clearance 24 between the periphery of portion 20 and the wall surface of bore 12 thereat. In contrast therewith, the flow path for effecting pulsation dampening in downstream portion 22 is defined by helical groove 26 communicating at its inlet 28 with clearance 24 and at its outlet 30 with gauge bore 12.

Figure 4:
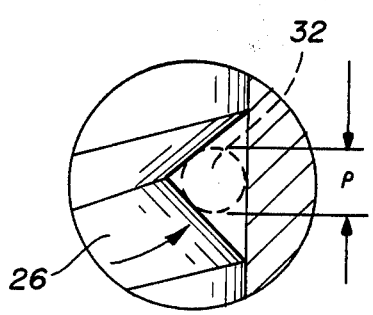
FIG. 4 is a fragmentary enlargement of encircled portion 4 of FIG. 2.
Figure 3:
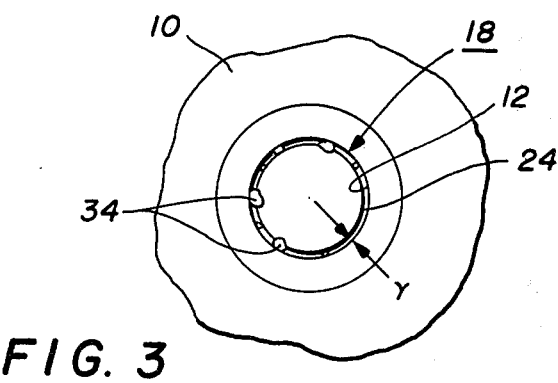
FIG. 3 is an end view of FIG. 2.

Groove 26 is of a V-configuration and its dimension permits passage of a particle 32 shown in phantom of maximum diameter "d" (FIG. 4). Obviously, any particle dimension greater than "d" would lodge in groove 26 and cause instant plugging thereat. To prevent that from occurring, clearance 24 is critically restricted to a radial dimension "r" (FIG. 3) equal to or less than dimension "d" of groove 26. In a preferred embodiment the ratio of r/d≦0.26 but can be varied to suit while the ratio of annular flow area of clearance 24/helix flow area of groove 26 is approximately 4.8 but can likewise be varied to suit.

Figure 2:
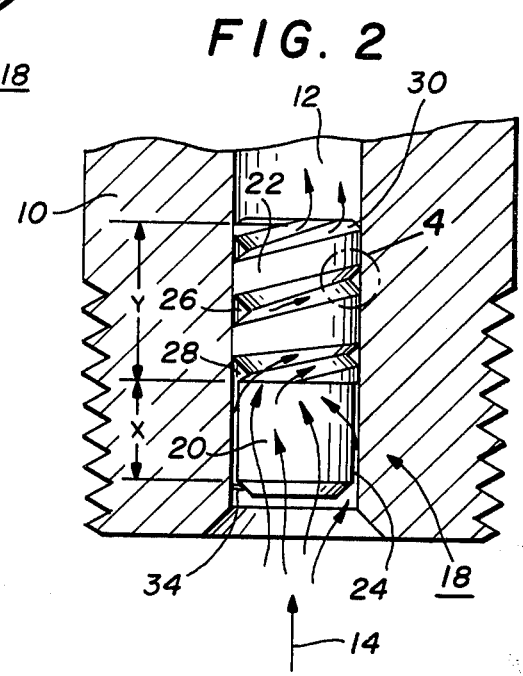
FIG. 2 is an enlarged fragmentary view of the socket features contained in FIG. 1.

By this arrangement, flow 14 must first pass through the clearance 24 before reaching the inlet 28 of helical groove 26 and in so doing, clearance 24 acts as a filter to particles contained in the flow of dimension larger than "r". Such particles for purposes of understanding are identified as 34 in FIGS. 2 and 3. Being trapped or filtered at or in clearance 24, the individual particles 34 cannot enter helix groove 26 and cause total plugging of the device as might otherwise occur, at least not until the entire circumference about plug portion 20 becomes totally blocked with particles. Consequently, rather than plugging being potentially caused to occur from a single particle 32 that might lodge in the helical but linear path of groove 26, an accumulation of particles 34 must occur in order to block clearance 24 and effect comparable plugging.

The advantages of the above should be instantly apparent in significantly reducing the maintenance as compared with the prior art construction of such pulsation dampeners. By the above disclosure, therefore, there has been described a novel pulsation dampener device of inexpensive construction and yet, operationally effective to significantly reduce the maintenance intervals for maintaining operability of such devices. Whereas the invention has been described and shown in the preferred embodiment with the throttling device hereof placed directly in the socket of the gauge per se, it should be readily apparent that the device could just as readily be placed in tubing or such other device defining a bore in direct communication with the upstream portion of the socket. Likewise, whereas downstream portion 20 has been described as having a helical path to effect the desired pulsation dampening; this is not intended as a limitation since any such path known for that purpose could be readily substituted therefor.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pulsation throttling device for a pressure gauge comprising:
   (a) an elongated cylindrical plug adapted for a snug fit in a bore communicating with the inlet to the sensing mechanism of a pressure gauge;
   (b) said plug including two axially contiguous portions including an upstream portion cooperating with the bore surface thereat to define an annular flow clearance therebetween, and a downstream portion cooperating with the bore surface thereat to define a selective flowpath therebetween effective to dampen pulsation in the flow being conducted in said bore; and
   (c) said annular flow clearance of said upstream portion having a radial dimension equal to or less than the minimum clearance afforded by the flow path of said downstream portion.

2. A pulsation throttling device according to claim 1 in which the upstream portion of said plug extends generally concentric with the surrounding bore surface thereat.

3. A pulsation throttling device according to claim 1 in which the ratio of the cross sectional flow area of said upstream clearance to the cross sectional flow area of said downstream flowpath is greater than 4 to 1.

4. A pulsation throttling device according to claim 1 in which the ratio of the radial dimension of said upstream clearance to the minimum clearance of said downstream flowpath is equal to or less than about 0.26.

5. A pulsation throttling device according to claims 1, 2, 3, or 4 in which said downstream flowpath comprises a helical groove.

6. In a pressure gauge including a tubular socket adapted for connecting to a source of fluid pressure to be measured and to communicate fluid from said source to the sensing mechanism of the gauge, a pulsation throttling device comprising:
   (a) an elongated cylindrical plug snug fit within the bore of said socket;
   (b) said plug including two axially contiguous portions including an upstream portion cooperating with the socket bore surface thereat to define an annular flow clearance therebetween, and a downstream portion cooperating with the socket bore surface thereat to define a selective flowpath therebetween effective to dampen pulsation in the flow being conducted in said bore;
   (c) said annular flow clearance of said upstream portion having a radial dimension equal to or less than the minimum clearance afforded by the flowpath of said downstream portion.

* * * * *